United States Patent Office.

L. OTTO P. MEYER, OF NEWTOWN, CONNECTICUT.

IMPROVEMENT IN SURFACE COMPOUNDS FOR IGNITING SAFETY-MATCHES.

Specification forming part of Letters Patent No. 153,451, dated July 28, 1874; application filed April 25, 1874.

CASE E.

*To all whom it may concern:*

Be it known that I, L. OTTO P. MEYER, of Newtown, in the county of Fairfield and State of Connecticut, have invented a certain Compound, presenting a surface against which what are known as safety-matches can be ignited, of which the following is a specification:

What are known as safety-matches cannot be ignited like other matches, by friction on any surface, but must be rubbed on surfaces having certain chemical properties; and hence such matches are termed safety-matches. The best surface for that purpose known prior to my said invention was prepared by coating with a paste composed of glue or gum-arabic containing gray sulphuret of antimony, bichromate of potassa, and red oxide of iron. Surfaces so prepared are not very durable, and do not effectually resist the injurious influence of moisture.

My invention consists of a compound of india-rubber, or allied gum, sulphur, and gray sulphuret of antimony, the said compound being vulcanized by heat, as in the preparation of what is known as hard rubber or vulcanite.

I have obtained the best results by using the ingredients in the following proportions by weight, viz: Two parts of pure india-rubber, one part of flowers of sulphur, twenty-three parts of powdered gray sulphuret of antimony.

The ingredients are to be mixed and vulcanized in the usual way of preparing hard rubber or vulcanite.

My improved compound can be adulterated by increasing the relative proportion of sulphuret, or by adding to the ingredients ground flint, pumice slate, or red oxide of iron; and the relative proportions of india-rubber and flowers of sulphur can be varied, as in making vulcanite.

This compound can be produced in any desired form; but sheets will be found most convenient.

The sheets of this compound, while in the green and plastic state, can be covered with tin-foil, as heretofore practiced in covering the hard compound for the production of vulcanite, and, after being plated with tin-foil, can be furrowed by dies. Surfaces with narrow parallel furrows serve to ignite the round match-points more easily, by affording more friction.

As this compound can be united, while in the green and plastic state, with the compound of india-rubber, sulphur, and adulteration, mixed in the proportions required for producing what is known as soft and pliable compound, and the two so united can be vulcanized together, it will facilitate the making of combined match-receptacles and igniters of any desirable shape.

If the said new compound be vulcanized in contact with tin-foil, the surface produced will be glossy, and, for use as a match-igniter, the gloss must be removed by a scraping-tool or by grinding.

Deep scratches as substitutes for furrows may be scraped lengthwise in plain smooth surfaces of the vulcanized compound; and, when the surface becomes dirty, it can be cleaned by washing with hot water, or by scraping.

What I claim as my invention, and desire to secure by Letters Patent, is—

The compound of india-rubber, or allied gum, sulphur, and gray sulphuret of antimony, substantially as described, forming a suitable surface on which to ignite safety-matches.

L. OTTO P. MEYER.

Witnesses:
   HENRY SANFORD,
   ELI C. BARNUM.